A. LACKEY.
MOP MAKING MACHINE.
APPLICATION FILED MAR. 18, 1908.

935,264.

Patented Sept. 28, 1909.
6 SHEETS—SHEET 1.

Witnesses:
J. Waldo Chrisinger
Elliott R. Goldsmith

Inventor:
ALEXANDER LACKEY,
BY Hugh K. Wagner,
His Attorney.

A. LACKEY.
MOP MAKING MACHINE.
APPLICATION FILED MAR. 18, 1908.
935,264.
Patented Sept. 28, 1909.
6 SHEETS—SHEET 5.
Fig. 5.
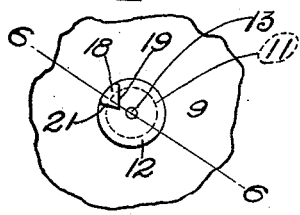
Fig. 7.
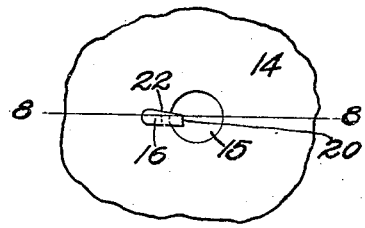
Fig. 6.
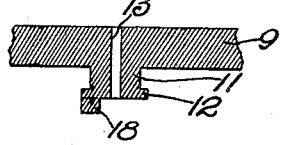
Fig. 8.
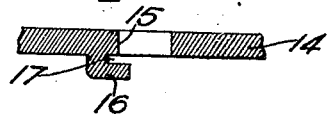
Fig. 9.  Fig. 10.  Fig. 11.
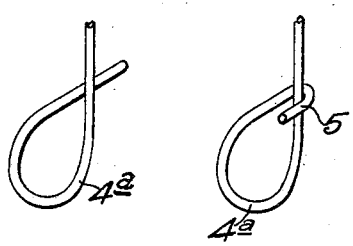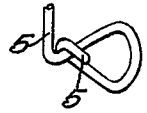
Fig. 12.
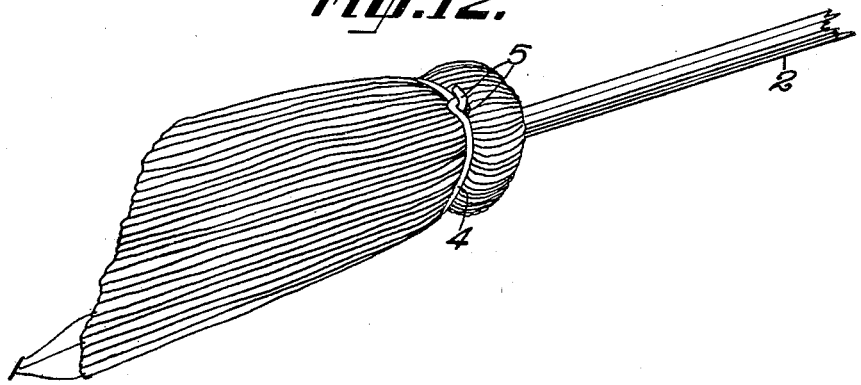
Witnesses:
J. Waldo Chrisinger
Elliott R. Goldsmith
Inventor:
ALEXANDER LACKEY,
By Hugh K. Wagner,
His Attorney.

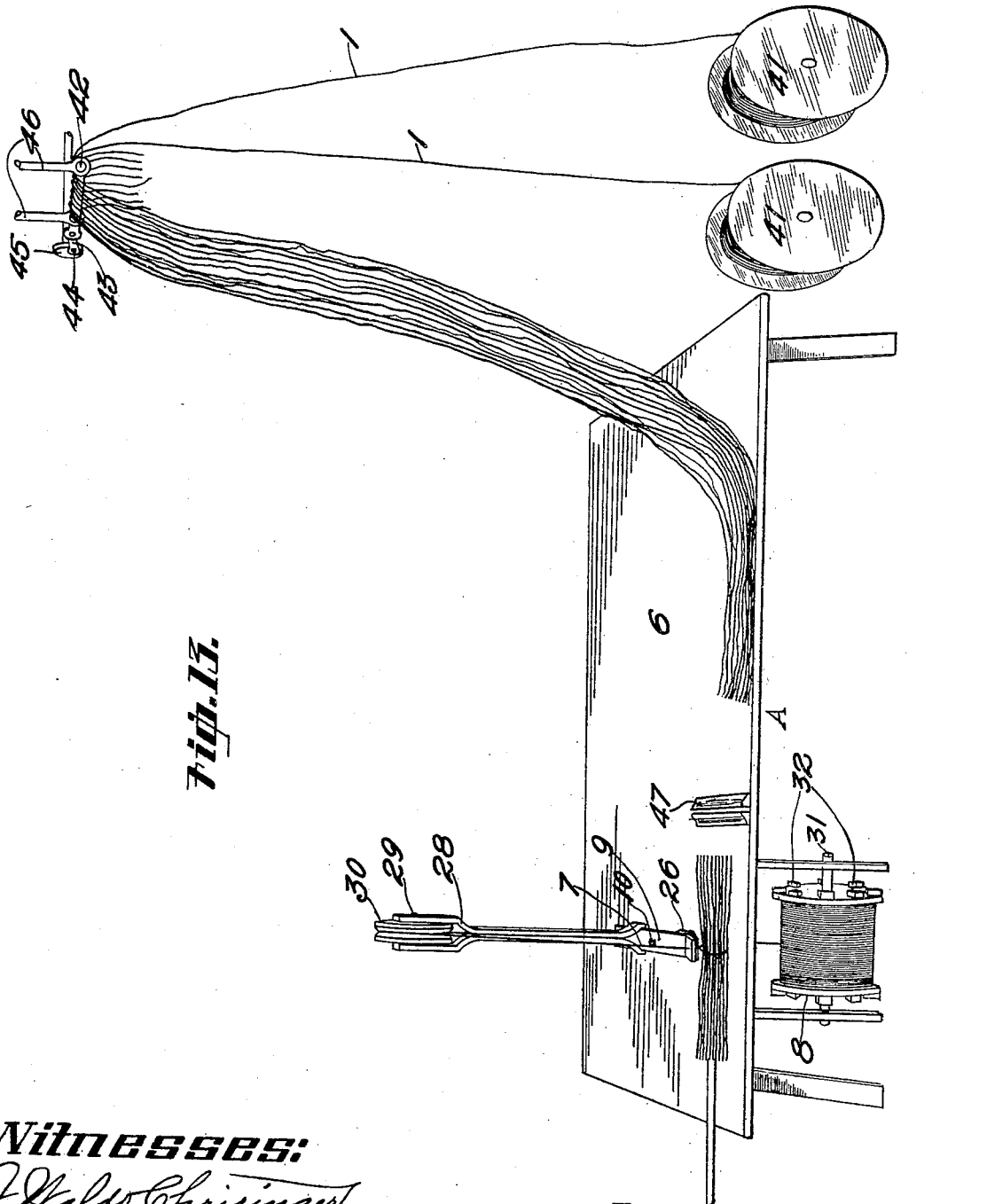

UNITED STATES PATENT OFFICE.

ALEXANDER LACKEY, OF ST. LOUIS, MISSOURI, ASSIGNOR TO SAMUEL CUPPLES WOODENWARE COMPANY, OF ST. LOUIS, MISSOURI, A CORPORATION OF MISSOURI.

MOP-MAKING MACHINE.

935,264.　　　　Specification of Letters Patent.　　Patented Sept. 28, 1909.

Application filed March 18, 1908. Serial No. 421,788.

*To all whom it may concern:*

Be it known that I, ALEXANDER LACKEY, a citizen of the United States, residing at the city of St. Louis, State of Missouri, have invented certain new and useful Improvements in Mop-Making Machines, of which the following is a specification, reference being had therein to the accompanying drawings.

This invention relates to mop-making machines, and has for its object to provide an apparatus adapted to bind the mop-strands to the handle by means of a wire binder, instead of by the old-fashioned binding cords.

The mop which is made by the use of the invention forming the subject-matter of this application is itself a new manufacture, and application (Serial Number 420,899) for patent for said new mop has been filed by me. It should be understood, however, that although the machine hereinafter described is particularly well adapted to the purpose of making mops, it may, with slight modifications, be used equally well for many other purposes, such, for example, as making brooms, binding grain, baling hay, and applying wire hoops to buckets, pails, etc.

Figure 1:
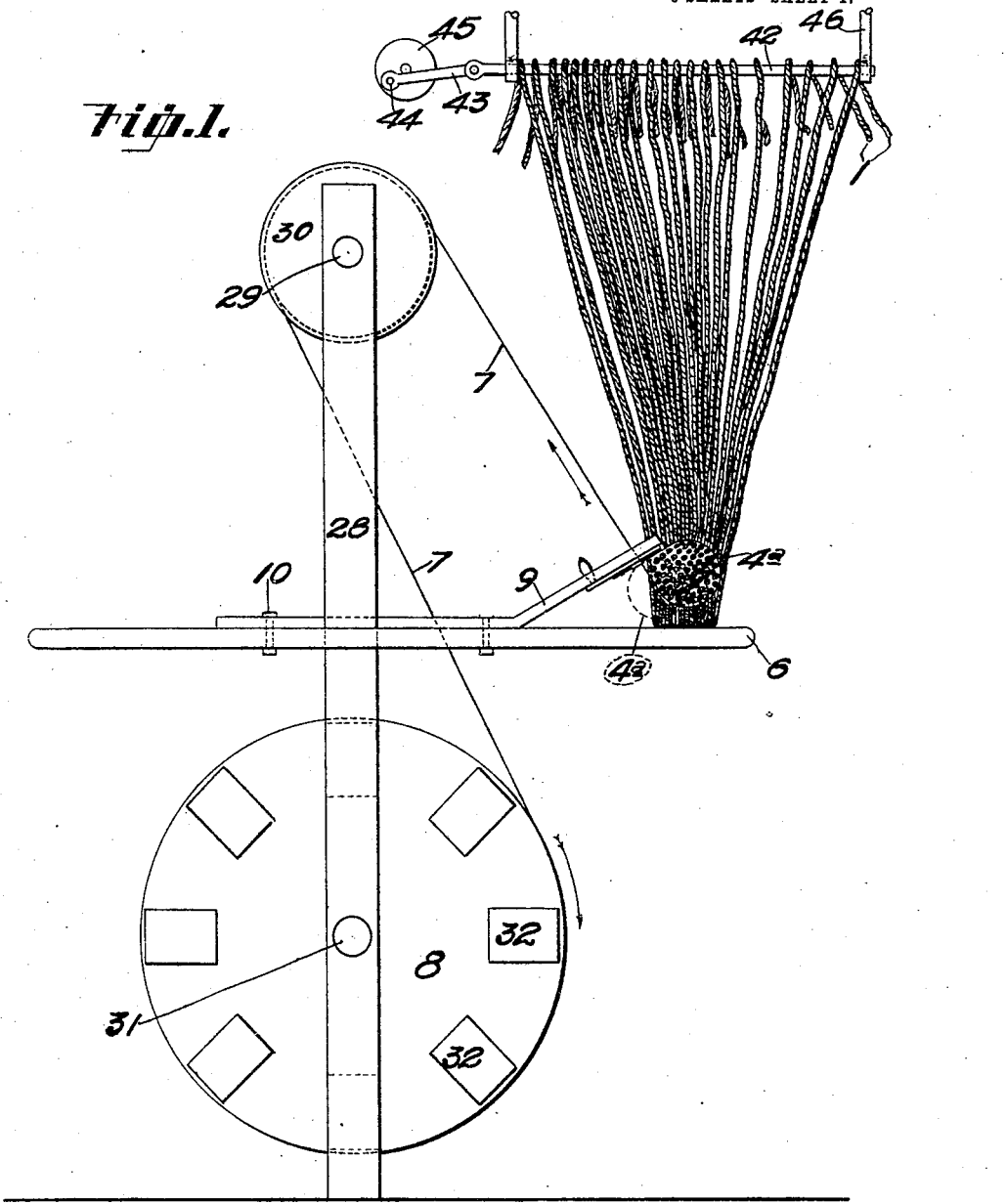
Figure 2:
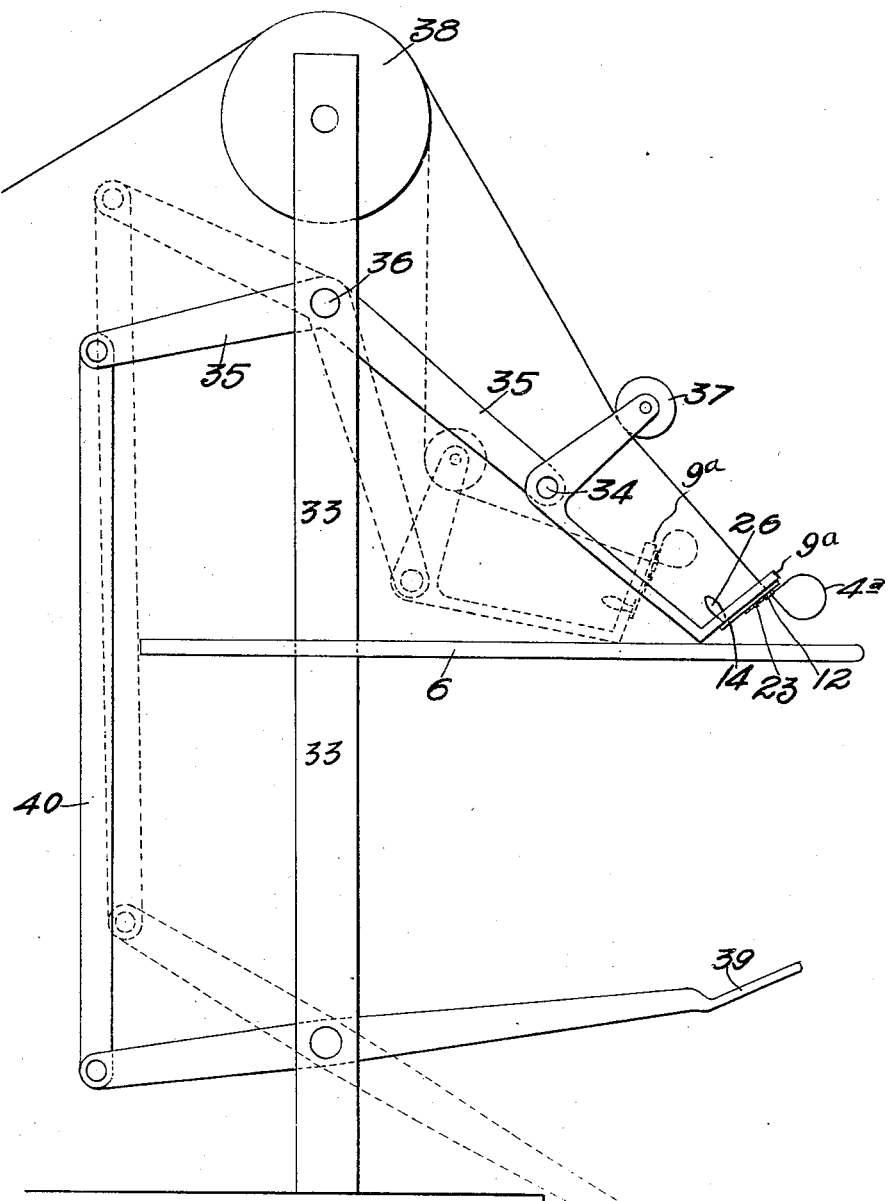
Figure 3:
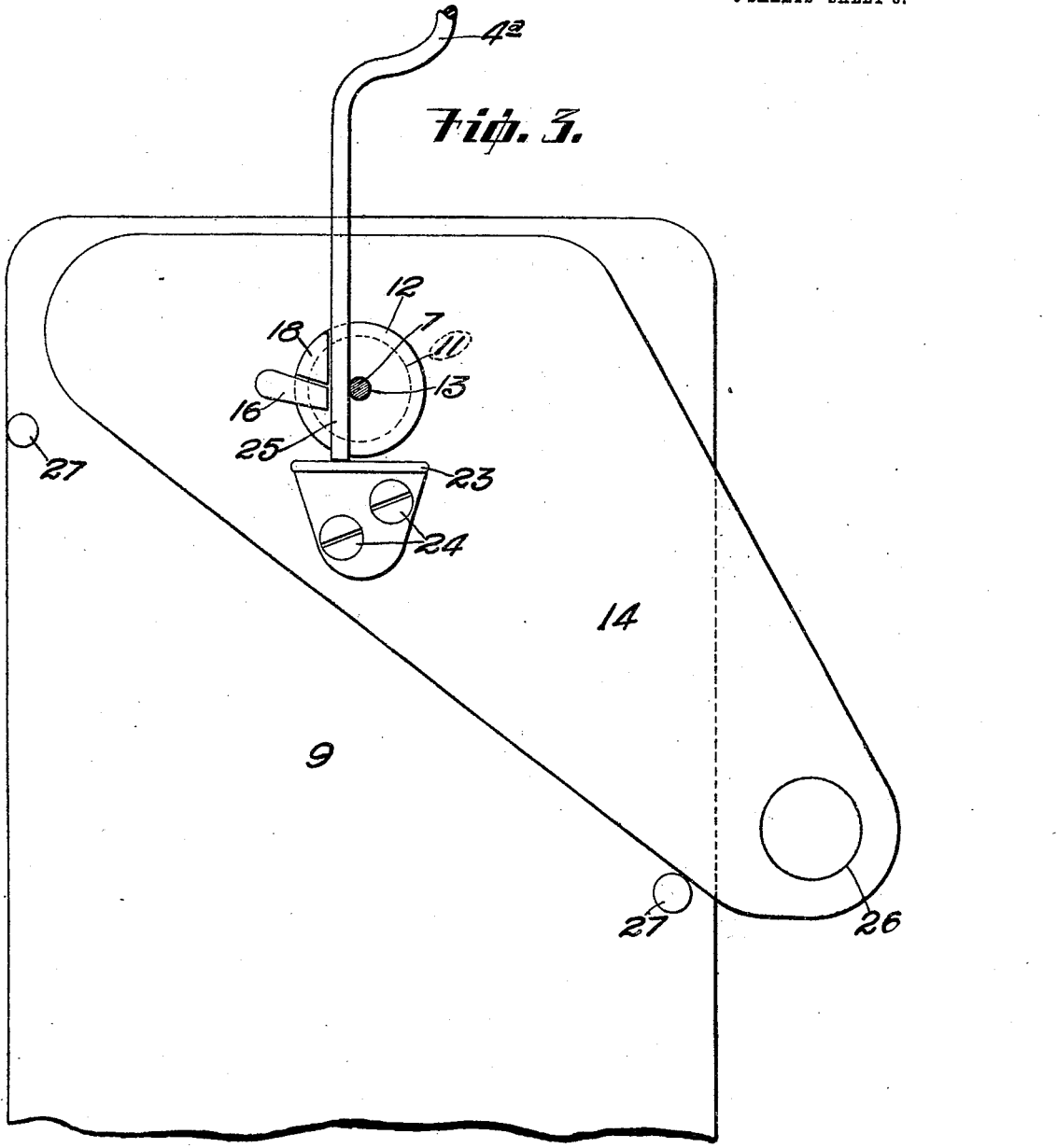
Figure 4:
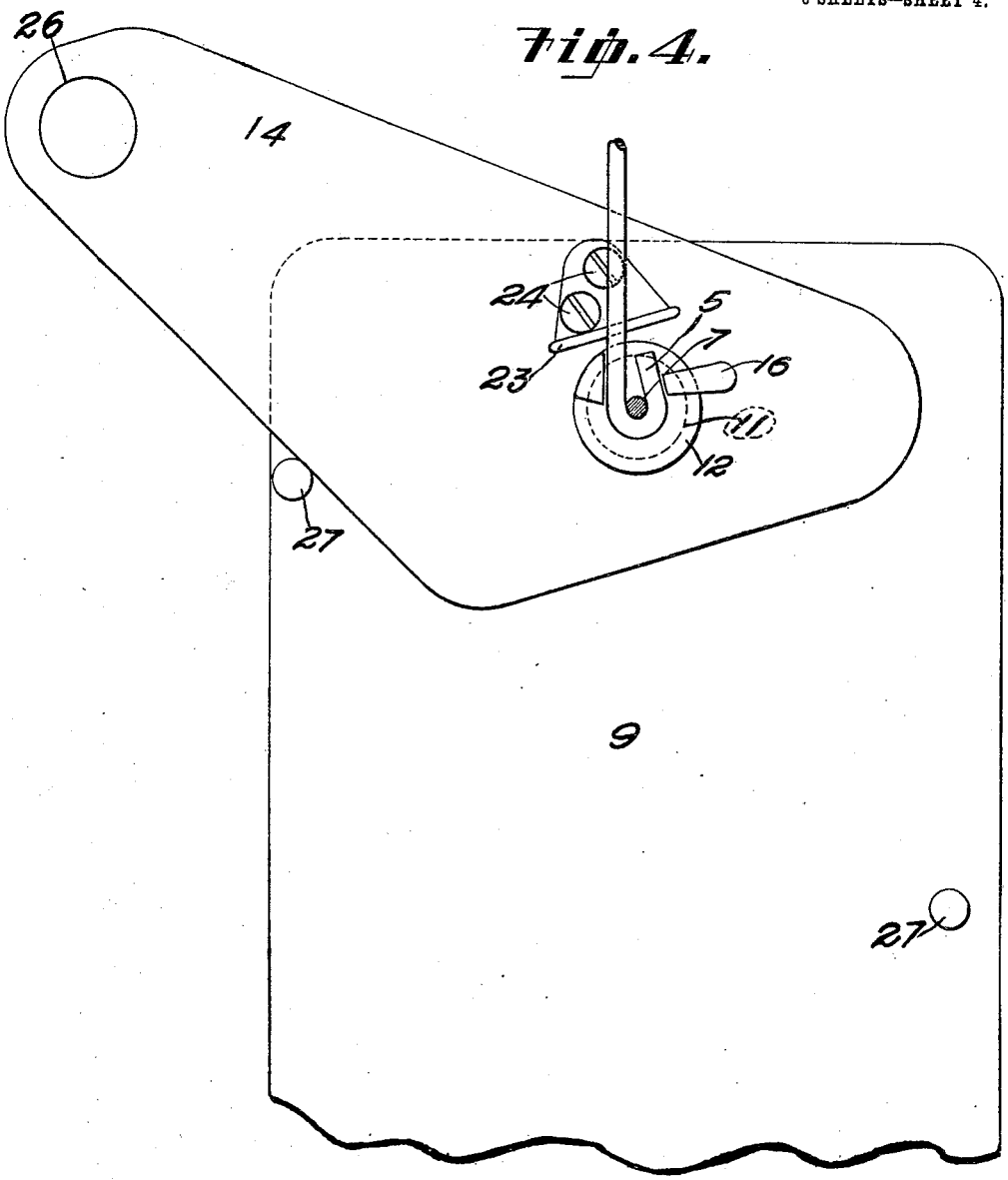

In the drawings forming part of this specification, in which like numbers of reference denote like parts wherever they occur, Figure 1 is a side elevation of the preferred form of the machine; Fig. 2 is a side elevation of a modified form of the machine; Fig. 3 is a bottom plan view of the parts which unite the ends of the binding-wires together, the movable parts being shown in starting position; Fig. 4 is another bottom plan view, showing the parts after the movable members have been advanced; Fig. 5 is a detailed view of the under side of the arm; Fig. 6 is a section on the line 6—6 Fig. 5; Fig. 7 is a detailed view of the under side of the swinging plate; Fig. 8 is a section on the line 8—8, Fig. 7; Fig. 9 is a perspective view of one of the binding-wires before either hook has been formed; Fig. 10 is a perspective view of one of the binding wires after the first hook has been formed; Fig. 11 is a perspective detail of the same wire, after formation of the second hook; Fig. 12 is a perspective view of the completed mop; and Fig. 13 is a front view of the machine, in perspective.

The mops made by this machine comprise the mop-strands 1 and the handle 2, bound together by the binding-wires 4, which wires are provided with interlocking hook-like ends 5. The object of this machine is to bind the strands upon the handle, by drawing the wires 4 tightly around the strands 1, and then bending the ends of said wires into hooks and interlocking them. If the subject-matter operated upon is, for example, a bundle of grain, instead of a mop, said bundle is manipulated in precisely the same manner as a mop would be handled; hence, while particular reference is hereinafter made to a mop, it should be understood that this is merely illustrative, and that the construction and mode of operation of the machine are the same no matter what article the machine is used to manufacture.

The mop-strands 1 and handle 2 which are to be bound together to form a mop are placed upon the table or work-bench 6 where the binding-wires 4 are applied. The individual short lengths 4 of wire which fasten the strands 1 to the handle originally form part of a stock of reeled wire 7, which as needed is drawn from reel 8, each short length being severed from the wire carried on the reel after said short length 4 has been wound about the mop and the ends of the wire secured together.

Above the table 6 is an arm or bracket 9, which arm, in the preferred form of the invention, is fixed to table 6 by bolts or screws 10. In the modified form, shown in Fig. 2, arm 9ª slides back and forth upon the table. On its under side, said arm 9 or 9ª (whether mounted in the preferred or the modified form) carries the devices for fastening together the ends of the binding-wire 4, and said arm serves, also, as a stop beyond which the mop can not pass during the time that the binding-wire is being applied and tightened. The ends of the binding-wire 4 are fastened together by bending each end of said wire into a hook 5, and causing said hooks to interlock, and the mechanism on the under side of arm 9 is provided to bend said hooks. On the under side of arm 9 is a cylindrical boss 11, at the lower end of which is the annular shoulder 12, a perforation 13 extending through the arm 9 and through the center of boss 11, the wire 7 passing through said perforation. A movable plate 14, provided with a perforation 15 which is of exactly the right diameter to encircle boss 11, is pivotally secured to the under side of arm 9, boss 11 passing through perforation 15, shoulder 12 bearing on the under side of plate 14, thus to keep the plate from dropping off arm 9. Said plate carries a presser-foot 16, which foot is notched at 17 to receive the shoulder 12, so that said foot projects over the bottom end of boss 11, extending part way to the perforation 13. Projecting downwardly from the boss 11 is a stud 18, which stud is of such shape that, when the movable parts are in the position shown in Fig. 3, face 19 of the stud lies in approximately the same plane as the end 20 of the foot 16, and face 21 of the stud 18 either engages or is closely adjacent to side 22 of foot 16. Upon the swinging plate 14 is a stop 23 held in place by screws 24, which stop is set just far enough from perforation 13 to allow the loose end 25 of the wire to be advanced the right distance for forming the first hook 5. The plate 14 is provided with a handle 26 by which said plate is swung, the plate and all parts carried thereupon moving in circles of which perforation 13 is the center. Stops 27, fixed to arm 9, confine the movement of the plate 14 within predetermined limits.

The method of forming the first hook 5 on the end of a wire is as follows: The wire 7 from the reel is passed through perforation 13, and bent around the mop which rests upon the table 6 so as to form a loop $4^a$ which encircles the mop, said loop later being severed from the main wire 7, becoming the binding-wire 4 when so severed. A space just wide enough to receive the end 25 of the wire loop $4^a$ is left between the face 19 of stud 18 and end 20 of foot 16 on one side and the perforation 13 and the wire which has just passed through said perforation 13 on the other, and end 25 is inserted in this space, forward movement of the end of the wire being limited by the stop 23. Having thus placed the loose end 25 of the loop $4^a$ in position, the operator grasps the handle 26, pulls the plate 14 from the position shown in Fig. 3 toward that shown in Fig. 4, and, as the foot 16 is thus carried in the arc of a circle about perforation 13, bearing all the while against end 25, said end is bent around the main part of the wire, gradually assuming a hook-like form. The stud 18, being in fixed relation to the arm 6, does not move when plate 14 is swung, and, as the wire which passes through perforation 13 will not bend at that point immediately beneath the arm 9 where the end 25 engages the main wire, stud 18 and the main wire serve as a vise to hold the loose end 25 of the loop $4^a$ while same is being made into a hook. When this hook has been bent, the plate is returned to starting position, the appearance of the wire before and after this bending operation being shown, respectively, in Figs. 9 and 10.

The table 6 carries a support 28 (said support preferably comprising a bifurcated standard) at the upper end of which is held a shaft 29 upon which revolves a sheave or pulley 30, over which pulley wire 7 passes. The reel 8 is supported below the table 6 upon a suitably-journaled shaft 31. To the reel 8 blocks 32 are secured, these blocks being provided so that the workman can place his feet thereupon, and, by pressing downward on said blocks, can rotate the reel and draw the wire in the direction designated by the arrows, Fig. 1. After the hook has been formed upon the end of the loop $4^a$, as hereinabove described (which hook, of course, hooks over the main part of the wire just below arm 9), loop $4^a$, which encircles the mop is drawn tightly upon the mop by the act of the workman in rewinding the wire 7 upon the reel, the wire, when thus pulled, sliding through the hook 5 then bent on end 25, and thus binds the mop-strands securely to the handle. When the wire has thus been drawn tightly enough, the workman (whose place is at the right of the machine, Fig. 1, and facing toward the left) pushes the mop from him, carrying the tightened wire loop from the full line toward the dotted line position in said figure, and, as the wire is held within the perforation 13, said wire, by this movement, is bent at a point just below the arm 9, thus forming a second hook 5 which lies in a plane at right angles to that hook 5 formed by the swinging of plate 14 and interlocking therewith, the condition of the wire at this stage being shown in Fig. 11. The workman then releases the pressure upon the reel 8 so that the wire can again be drawn thereoff, severs the loop $4^a$ from the main wire 7, and then clenches the second hook on the loop $4^a$ (which has now become the binding wire 4) by a stroke of a hammer.

In the modified form shown in Fig. 2, standards 33 extend above and below the table 6, and the arm 9, instead of being fastened to the table, is pivoted at 34 to a lever 35 which rocks upon a shaft 36 supported by standards 33. Arm 9 carries exactly the same hook-forming device as shown in Figs. 3 and 4, and carries, also, a pulley 37 beneath which wire 7 passes. By a device not shown, a brake can be applied either to pulley 38 (around which the wire is wrapped) or to the reel from which the wire 7 passes, and that end of the wire held against movement. The hook 5 at end 25 having been formed in the manner hereinabove described, treadle 39 is depressed, said treadle being connected by weighted pitman 40 to lever 35, thus causing all parts to move toward the dotted-line positions, Fig. 2, the wire 7 being stretched taut by the action of the pulley 37 in bearing down thereupon. When the loop $4^a$ has been thus tightened upon the mop, the second hook is formed, as in the other machine. The workman then removes his foot from the treadle and the weighted pitman returns all parts to the initial position depicted in full lines, Fig. 2, upon which return of the movable parts to initial position the workman moves the mop away from the arm 9 and severs the wire loop 4ᵃ from the main wire. Obviously, as a length of wire sufficiently long to bind the second mop is left unreeled after the first mop has been bound, and as this length is drawn through perforation 13 by the act of the workman in pulling the first mop away from arm 9, it follows that after the manufacture of each mop is completed the wire required to bind the next mop is left extending beyond or dangling from arm 9, in readiness to be seized by the workman and looped around the strands 1 and handle 2 of the second mop whenever said strands and handle have been selected and placed upon the table 6.

Heretofore in the manufacture of mops, it has been customary to place before the workman piles of strands all cut to length, but by the use of this machine, the workman severs the strands just as he needs them, the strands being carried upon spools 41 from which they are unwound as required. Midway between the spools 41 and the table 6 is a rod 42, which is caused to reciprocate by an arm 43 eccentrically pivoted at 44 to a suitably-driven wheel 45, and the strands loop over this rod before reaching the table. As rod 42 moves back and forth, sliding within the hangers 46 which depend from the ceiling, the strands are gently agitated and all kinks thereby shaken out, the strands allowed internally to twist or untwist, etc., so that they reach the table 6 in a soft and pliable condition. When a mop is to be made, the workman grasps all the strands with one hand, the ends of all the strands being closely adjacent to each other at the point designated A, Fig. 13, then severs all the strands simultaneously by a knife which moves within the guide-blocks 47, the short pieces of mop-strands thus cut off being of exactly the right length to form a mop, after which the severed strands are bound upon the handle. Every mop, accordingly, is composed of the same number of strands as any other mop, yet it is not necessary to count or weigh the strands for each individual mop, which must be done if uniformity is to be secured in cases where the strands for a great number of mops are cut to length beforehand.

Having thus described my said invention, what I claim and desire to secure by Letters-Patent is:

1. In a machine of the character described, the combination of an arm, a cylindrical boss projecting therefrom, a perforated member rotatable upon said boss, said arm and boss being perforated, a stud upon said boss, and a foot upon said rotatable member, which foot extends over the ends of said boss.

2. In a machine of the character described, the combination of an arm, a cylindrical boss projecting therefrom, a perforated member rotatable upon said boss, said arm and said boss being perforated, a shoulder on said boss, which shoulder engages said rotatable member, a stud upon said boss, and a foot upon said rotatable member, said foot being notched to receive said shoulder.

3. In a machine of the character described, the combination of a perforated member, said perforation being adapted to receive the binding wire, a stud which projects from said member adjacent to said perforation, said stud being spaced away from said perforation a distance sufficient to permit insertion of the loose end of the wire between said stud and that part of the wire which passes through said perforation, a movable member which engages said wire-end, and means to carry said movable member in the arc of a circle about the perforation in said first-mentioned member.

4. In a machine of the type set forth, an arm having a perforation, a swinging plate having a perforation for registry with said perforation of the arm, a wire engaging member carried by said arm and projecting on the outer face of said plate and a wire engaging member carried on the outer face of said plate to coöperate with said wire engaging member to form a hook on the wire.

5. In a machine of the type set forth, a pair of members one of which is relatively stationary, each member having a perforation which register with one another, means whereby the other of said members may have partial rotary movement with respect to said relatively stationary member, wire engaging means carried by said relatively stationary member and projecting on the outer side of said rotatable member, and wire engaging means carried by said rotatable member on its outer side to coöperate with said wire engaging means of said relatively stationary member, said registering perforations of said members being adapted to receive one end of the wire and being located in proximity to said wire engaging means of the relatively stationary member so as to coöperate therewith to hold the opposite end of the wire during the process of forming the hook.

6. In a machine of the type set forth, a pair of members each having a perforation therein which register with one another, one of said members being relatively stationary, means whereby the other member may have rotatable movement with respect to said relatively stationary member, said perforations of said members being adapted to have one end of the wire passed therethrough, a wire engaging member secured to said rotatable member and located to one side of said registering perforations, and stop means carried by said rotatable member and disposed transversely to said wire engaging member to engage the extremity of the opposite end of the wire to determine the length of the hook.

7. In a machine of the type set forth, means for holding the main part of the wire, said main part being looped to inclose the article to be bound, means adapted to revolve around said main part and bend one end of the wire in the form of a U around said main part, and means adapted to decrease the size of the loop and draw said main part of the wire through said U to engage upon the article.

8. In a machine of the type set forth, means for holding the main part of the wire at a point distant from its free end, said free end of the wire being looped to inclose the article to be bound, means adapted to slide on and coöperate with said holding means to bend said free end of the wire in the form of a U around the wire adjacent its said point of securement, and manually controlled means adapted to decrease the size of the loop and draw the main part of the wire tight about the article.

9. In a machine of the type set forth, means for holding stationary an intermediate part of the wire after the same has been looped about the article to be bound, means for forming a hook on the free end of the wire around the stationary main part of said wire, and means adapted to adjustably exert longitudinal tension on the wire to draw the main part thereof through said hook to tightly bind upon said article.

10. In a machine of the type set forth, means for holding a wire against lateral movement, means in conjunction with said holding means for forming a hook upon one end of said wire, and means for drawing the main part of the wire through said hook, said holding means serving to secure the wire during manual formation of an oppositely disposed second hook thereon to interlock with said first hook.

11. In a machine of the type set forth, a pair of members one of which is movable with respect to the other, said members being provided with registering perforations through which the main part of a wire is adapted to be passed, the free end of the wire being adapted to be disposed transverse to said main part of the wire and to abut the same, means secured to said movable member adapted to engage the free end of said wire at a point opposite to the point at which said free end of the wire abuts said main part of the wire, and means to limit the movement of said movable member whereby it will bend the free end of the wire in the form of a U to inclose said main part of the wire.

12. In a machine of the type set forth, a stationary member, a movable member mounted on said stationary member and having a sliding movement thereon, and opposing projections carried by said member for forming a wire hook.

13. In a machine of the type set forth, a stationary member having a flat face and a bearing thereon, a movable member having a face opposed to said flat face and mounted on said bearing, and opposing projections carried by said members to form a wire hook upon movement of said movable member on said bearing.

14. In a machine of the type set forth, in combination with a support, an inclined arm having one end secured to said support and having its opposite end spaced therefrom, and means carried by and adapted to operate with said arm to form a hook on the wire binder, said arm being adapted to hold the wire during manual movement of the wire and the article to be bound, thereby to form a second hook on said wire opposite to said first hook which interlocks with the first named hook.

15. In a machine of the type set forth, in combination with a support, a member having an angular disposition with respect to said support, said member being adapted to engage the wire for binding the mops, means movably connected to and adapted to act in conjunction with said arm to form a hook thereon, and means adapted to decrease the length of the wire in said loop and draw the wire tightly about the mops, the mops being adapted to engage one side of said member during the tightening of said wire and being thereby held against movement.

16. In a machine of the type set forth, a pair of members which have a perforation in each which register with one another, means whereby one of said members may have a frictional swinging movement against the other, said registering perforations being adapted to have one end of the binder wire passed therethrough, the other end of the binder wire being adapted to engage said first named end of the wire and to lie transversely thereto, and projections on said members engaging the second named end of the wire in opposing directions.

In testimony whereof I have affixed my signature in presence of two witnesses.

ALEXANDER LACKEY.

Witnesses:
ELLIOTT R. GOLDSMITH,
GLADYS WALTON.